United States Patent [19]

Oas et al.

[11] 4,357,288

[45] Nov. 2, 1982

[54] METHOD OF MAKING CLEAR TRANSPARENT POLYPROPYLENE CONTAINERS

[75] Inventors: David C. Oas, Lenox; Delore M. Clairmont, Richmond, both of Mass.

[73] Assignee: Deacon Machinery, Inc., Pittsfield, Mass.

[21] Appl. No.: 124,138

[22] Filed: Feb. 25, 1980

[51] Int. Cl.³ .............................................. B29C 17/07
[52] U.S. Cl. ................................... 264/40.6; 264/529; 264/532; 264/535; 264/537
[58] Field of Search ............... 264/523, 532, 537, 538, 264/328.1, 328.14, 328.16, 328.17, 328.19, 40.1, 40.6, 529, 535; 425/526, 533, 552

[56] References Cited

U.S. PATENT DOCUMENTS

| Re. 26,956 | 9/1970 | Wiley . | |
|---|---|---|---|
| Re. 28,063 | 7/1974 | Scalora . | |
| 3,025,572 | 3/1962 | Bosoni | 264/328.14 X |
| 3,733,309 | 5/1973 | Wyeth et al. . | |
| 3,923,943 | 12/1975 | Iriko et al. | 264/537 X |
| 4,091,057 | 5/1978 | Weber | 264/328.17 X |

OTHER PUBLICATIONS

W. E. Elwell, "Polypropylene", *Modern Plastics Encyclopedia*, 1967, pp. 279–280.

Primary Examiner—Jan H. Silbaugh
Attorney, Agent, or Firm—Kenyon & Kenyon

[57] ABSTRACT

Biaxially oriented low cost polyolefin bottles of improved optical clarity, gloss, and strength, and useful for packaging materials such as liquid detergents, shampoos, pharmaceuticals and intravenous solutions, are prepared by stretch blow molding polypropylene homopolymer co-polymer and allomer parisons or preforms which are formed from low temperature melts at temperatures just above the melting points of the polymers and allomers, and are injected at constant rates against cold polished mold surfaces at relatively low pressures and at slow rates to avoid melt fractures. Melt temperatures of from 490° to 700° F. are preferred for polypropylene blow mold type polymers and allomers. Polished beryllium copper mold surfaces are desired for high luster gloss finishes. Mold temperatures of from 30° to 80° F. are preferred. Injection molding with a high compression ratio of 3 to 3.5 for insuring a homogeneous melt is preferred with a relatively slow injection rate to fil the mold cavity of about 3 to 10 seconds. The low temperature molding limits the size and increases the number of spherulites that form as the melt cools and solidifies thus minimizing crystallinity in the parison. The low mold temperatures provide faster molding cycles, increasing production and reducing costs but the injection rate is sufficiently slow to avoid melt fracture. The strength blow molding is preferably conducted at temperatures just below the amorphous flow temperature of the parison with temperatures of about 295° F. being sufficient for the polypropylene copolymer and about 325° F. below satisfactory for the polypropylene homopolymer.

1 Claim, 9 Drawing Figures

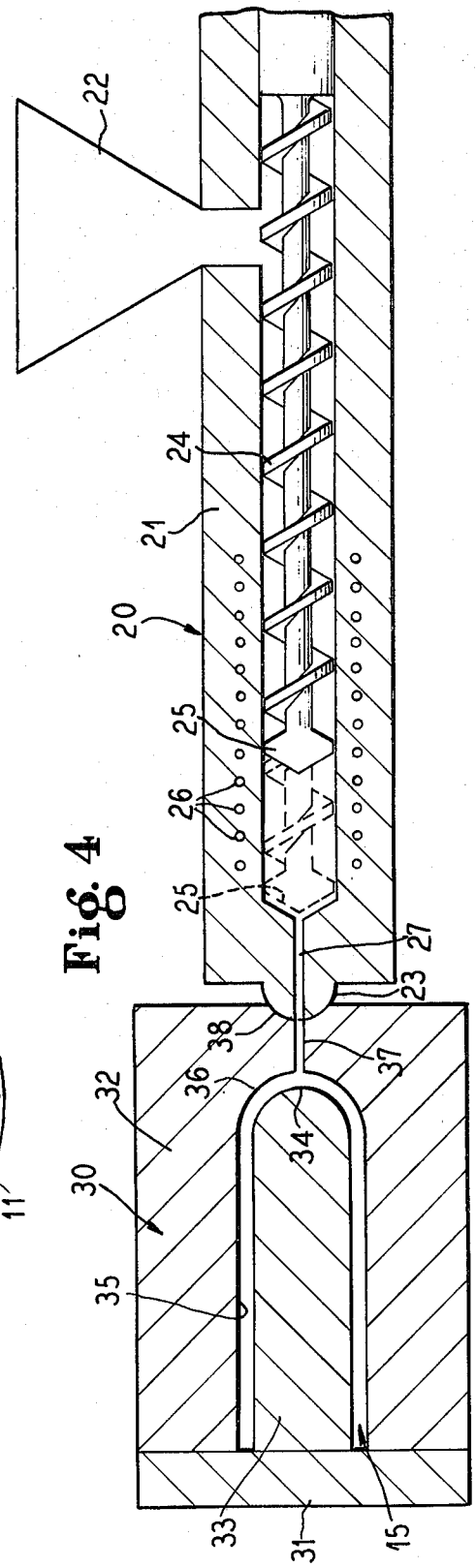

METHOD OF MAKING CLEAR TRANSPARENT POLYPROPYLENE CONTAINERS

FIELD OF THE INVENTION

This invention relates to the art of making clear biaxially oriented containers, such as bottles, from low cost blow mold polypropylene polymer formulations under controlled conditions which enhance the clarity and gloss of the finished container. Specifically the invention deals with the production of biaxially oriented polypropylene bottles of exceptional clarity, gloss and strength.

PRIOR ART

Stretch blow molding of crystalline polymer and allomer formulations to produce biaxially oriented bottles is known in the art but heretofore known techniques have not been able to produce clear, transparent, gloss finish bottles from relatively low cost polypropylene formulations. Low cost blow mold polymer and allomer formulations have heretofore only provided opaque or cloudy bottles and even the more expensive formulations have not produced fully satisfactory clear transparent bottles with long shelf life.

It would therefore be an improvement in the art to produce clear, transparent, gloss finish, strong bottles with satisfactory shelf life from low cost polypropylene formulations.

SUMMARY OF THE DISCLOSURE

According to this invention clear, transparent, gloss finish, strong containers, such as bottles, are produced from low cost crystalline polypropylene, homopolymer, copolymer and allomer formulations by stretch blow molding parisons molded from low temperature melts on low temperature mold surfaces at rates which are slow enough to avoid melt fracture. The parisons are stretch blow molded at temperatures just below the amorphous blow temperature of the plastics material under conditions which will biaxially orient the plastics material. The melt temperatures for producing the parisons are kept at the lowest levels that will produce a complete and clear melt. The clear melt is molded on polished mold surfaces, preferably by injection molding, and these mold surfaces are kept at low temperatures.

A simple test to determine the clarity of the parison melt is to conduct an "air shot" of releasing molten material from an injection unit and observing its clarity as it flows to the floor since the cooled molded parison will not be clear even though it produces clear bottles according to this invention.

According to a preferred embodiment of this invention, a crystalline high density polypropylene blow mold formulation of the type readily available on the market, is heated to just above its crystalline melting point where it will flow freely. Melt temperatures of from 490° to 700° F. are useful with the lowest temperatures within this range being selected to lie just above the melting point index for the formulation. The melt is preferably formed in an injection unit which will discharge the molten polypropylene through a nozzle into a cold mold having polished mold surfaces forming a cylindrical round bottom relatively thick parison of a generally test tube configuration. Heaters in the injection unit maintain the polypropylene just above its melting point index temperature and, from time to time, to check the sufficiency of the temperature for producing a clear melt, the nozzle of the injection unit is withdrawn from the mold and a sample of the melt is allowed to drain out of the nozzle for a determination as to its clarity. If the molten mass leaving the nozzle is cloudy, the temperature of the injection unit is raised just sufficiently to produce a clear melt.

The mold receiving the melt from the injection unit is preferably formed in two parts with a cylindrical core having a rounded end and a cylindrical molding cavity surrounding the core with a sprue opening to the nozzle of the injection unit. The core and cavity forming portions of the mold are kept relatively cool at room temperature and preferably about 30° to 80° F. The mold surfaces are highly polished and are preferably formed of good heat conducting metal such as beryllium copper.

The injection rate to fill the mold cavity is relatively slow to avoid "melt fracture" or shearing of the molecules. Injection times of from 3 to 10 seconds are desirable.

The parison is stripped from the mold, cooled, then reheated uniformly to temperatures of about 5° to 10° F. below its amorphous or flow temperature. Temperatures of about 295° F. for polypropylene copolymer and about 325° F. for polypropylene homopolymer are sufficient. The heated parison is then mounted in an inverted position on the swage plug of a stretch blow molding machine surrounding the stretch rod of the machine. The mold is then closed to clamp the open end of the parison forming a threaded neck. The stretch rod is then extended to push against the closed end of the parison, fluid is blown into the parison, and the unclamped portions of the parison are stretched axially and radially into confirmity with the mold cavity thus producing a bottle of the desired contour.

The parison can also be formed from the polypropylene melt by extrusion around a cooled core through a cooled die forming an open end tubular rod. Then the stretch blow molding is carried out on apparatus which will pull the rod and pinch the top end of the parison to a closed or sealed end whereupon the blow molding will progress the same as with an injection molding closed end parison.

Examples of suitable commercial stretch blow molding high density crystalline homo- and copolymer formulations are:

| Formulation | Supplier |
| --- | --- |
| Phillips Marex homopolymer HGN-020-02 | Phillips Chemical Company of Bartlesville, Oklahoma |
| Northern Petrochemical copolymers DPP7300GF; DPP8300 and DPP8307GO | Northern Petrochemical Co. of Clinton, Mass. |
| Mitshubushi EX-6 polypropylene copolymer | Mitshubushi Chemical Industries, Ltd. of Tokyo, Japan |
| Shell 6313 polypropylene copolymer | Shell Chemical Co. of Houston, Texas |
| Rexene polypropylene 23M2 | Rexene Polyolefins Company of Paramus, New Jersey |
| Arco Dypro-copolymer 8815-11 | Arco Polymers, Inc. of Philadelphia, Pa. |
| Tenite polyallomer M-7853-296E | Eastman Chemical Products, Inc. of Kingsport, Tenn. |

It should be understood, however, that other commercially available homo- and copolymer polypropylene blow mold grade resins are useful and that allomer formulations are also useful.

It is then an object of this invention to produce clear transparent glossy biaxially oriented polypropylene bottles.

A further object of the invention is to provide a method of increasing the clarity of biaxially oriented polypropylene containers.

A further object of this invention is to improve stretch blow molding processes of making polypropylene material bottles and other containers from parisons which are molded from melts just above the melting point of the polypropylene material, molded on cold polished surfaces, and then stretch blow molded at temperatures just below the amorphous flow temperature of the plastics material.

A specific object of this invention is to provide a method of making polypropylene bottles of enhanced clarity and gloss by careful control of melt temperatures, mold temperatures, and injection rates in forming the parisons for the bottles.

Another specific object of this invention is to provide a method of making parisons for biaxially oriented polypropylene bottles which are injection molded at temperatures just high enough to insure no melt fracture and lying in the range from 490° to 700° F. into cold highly polished molds maintained at temperatures from about 30° to 80° F. at relatively slow flow rates of from 3 to 7 seconds.

Other and further objects of this invention will become apparent to those skilled in this art from the following detailed description of the annexed sheets of drawings which show a preferred embodiment of the invention.

ON THE DRAWINGS

FIG. 1 is a perspective view of a bottle according to this invention;

FIG. 2 is a perspective view of an injection molded parison made according to this invention for producing the bottle of FIG. 1;

FIG. 3 is a longitudinal cross-sectional view along the line III—III of FIG. 2;

FIG. 4 is a somewhat diagrammatic longitudinal sectional view of an injection molding assembly for producing parisons according to this invention;

AS SHOWN ON THE DRAWINGS

Figure 5:
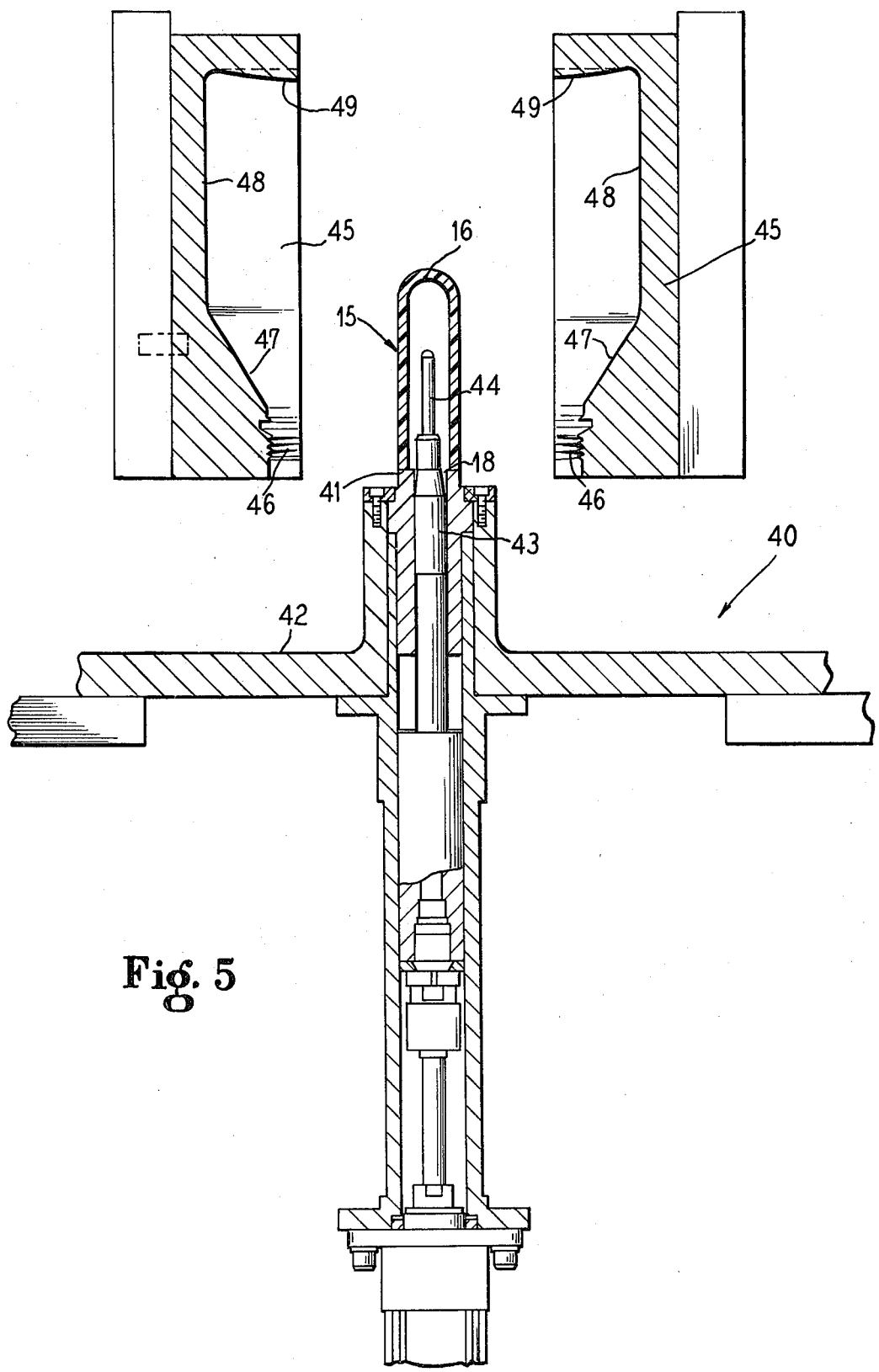
FIG. 5 is a somewhat diagrammatic vertical cross-sectional view of stretch blow mold apparatus used to produce the bottles of this invention showing a start up position with the parison of FIGS. 2 and 3 in place.

The bottle 10 of FIG. 1 has a concave bottom 11, a cylindrical main sidewall 12, a conical upper portion 13, and a cylindrical upstanding thickened externally threaded neck 14 on the convergent end of the portion 13. The bottle can be of any desired size or shape with sizes of from ½ to 4 liters being very useful. The wall thickness need only be on the order of 15 to 30 mils with the neck portion 14, however, being much thicker and rigid to support a pressure retaining screw type cap. Thus, the neck may be many times the thickness of the main wall and the conical portion 13 may be gradually thickened as it approaches the neck.

The bottles of this invention have a transparency of from 90 to almost 100 percent, a haze of only about 2 to 8 percent and a high gloss finish of from about 35 to 80 percent. Haze is measured according to ASTM Standard D1003 while gloss is measured at temperatures of 45° F. at ASTM Standard D2457. Transparency is measured in terms of the total light passing through the bottle.

The bottles 10 are inert to the contents packaged therein and have a long shelf life. Tensile break strengths of from about 10,000 to over 16,000 pounds per square inch are obtained. The concave base 11 is also preferably substantially thicker than the sidewall on the order of 2 to 3 times the thickness of the sidewall.

The parison 15 of FIGS. 2 and 3 has a hemispherical bottom 16, a cylindrical sidewall 17 and an open circular mouth 18. The bottom 16 and sidewall 17 are relatively thick on the order of about 0.16 inches. A preferred parison will have an internal diameter of about 1 inch, an external diameter of about 1.35 inches, and an overall length of about 4.3 inches.

As shown in FIG. 4, the parison 15 is formed in an injection molding unit 20 having a barrel 21 fed by an inlet hopper 22 and ejecting the melt through a round nose nozzle 23. The barrel 21 rotatably mounts a melting and mixing screw 24 with a non-return valve nose 25. Heater bands 26 are provided in the barrel 21. Crystalline polypropylene stretch blow mold formulations are fed through the hopper 22 into the barrel 21 where they are advanced by the melting and mixing screw 24 to a molten condition at the valve end 25 whereupon the screw is advanced to the dotted line position where the valve nose 25 will force the molten material through the nozzle orifice 27.

The apparatus 20 includes a two-part mold 30 with a first core part 31 and a second molding cavity defining part 32. The part 31 has a cylindrical core 33 with a hemispherical end 34. The part 32 has a cylindrical molding cavity 35 with a hemispherical bottom end 36 fed by a sprue hole 37. The end wall of the part 32 has a recess 38 receiving the rounded nose of the nozzle 23.

With the apparatus in the position of FIG. 4 the molten plastics material ahead of the valve 25 is ejected through the orifice 27 by moving the screw rod to the dotted line position. The molten material will flow through the sprue 37 into the mold cavity around the core 33.

According to this invention the speed of rotation of the screw 24 and the temperature of the heaters 26 are so adjusted as to melt the plastics material from the hopper 22 just above the melting index temperature of the formulation so that molten plastics material ahead of the valve 25 will be in a clear condition. To test the clarity of the melt, the injection unit 20 and the mold 30 are separated and the screw 24 is pushed toward the end of the barrel to eject a sample of molten plastic out of the nozzle orifice 27 permitting it to drain by gravity. A sighting of the clarity of the plastic as it drains will show the operator whether the melt is sufficiently free flowing without being overheated to form a parison which can produce the bottles of the invention.

The surface of the core 33 and the molding cavity surfaces 35 and 36 are highly polished and are maintained relatively cool as by radiation or internal cooling if necessary. Polished beryllium copper is a desired mold metal since it has excellent heat transfer properties and will take a high polish. Mold temperatures of from 30° to 80° F. are desired.

Melt temperatures of the plastics material flowing through the orifice 27 into the sprue 37 are carefully controlled to be just slightly above the melting point index of the formulations fed from the hopper 32 with temperatures in the range of 490° to 700° F. being satisfactory for polypropylene stretch blow mold formulations. These temperatures are sufficiently above the crystalline melt temperature to avoid melt fractures during injection and are sufficiently below the temperatures which will degrade the plastics formulation.

The injection rate is relatively slow, being on the order of from 3 to 10 seconds to fill the mold cavity.

Upon solidification of the parison 15 in the mold 30, the mold is opened by withdrawing the part 31 from the part 32, the parison is stripped from the mold, and is uniformly heated to a temperature just below its amorphous flow temperature, with temperatures of from 5° to 10° F. below the amorphous flow temperature being desired.

Then, as shown in FIG. 5, the uniformly heated parison 15 is placed in a stretch blow mold apparatus 40 in an inverted position with its open end 13 resting on a platform 41 on a base 42 surrounding a reciprocal swage 43. The parison freely receives the retracted end of the stretch rod 44 of the apparatus 40. The split molding dies 45 of the apparatus 40 are in an opened condition and have threaded neck forming wall portions 46, tapered cone forming portions 47, cylindrical main body forming portions 48 and concave bottom forming portions 49.

Figure 6:
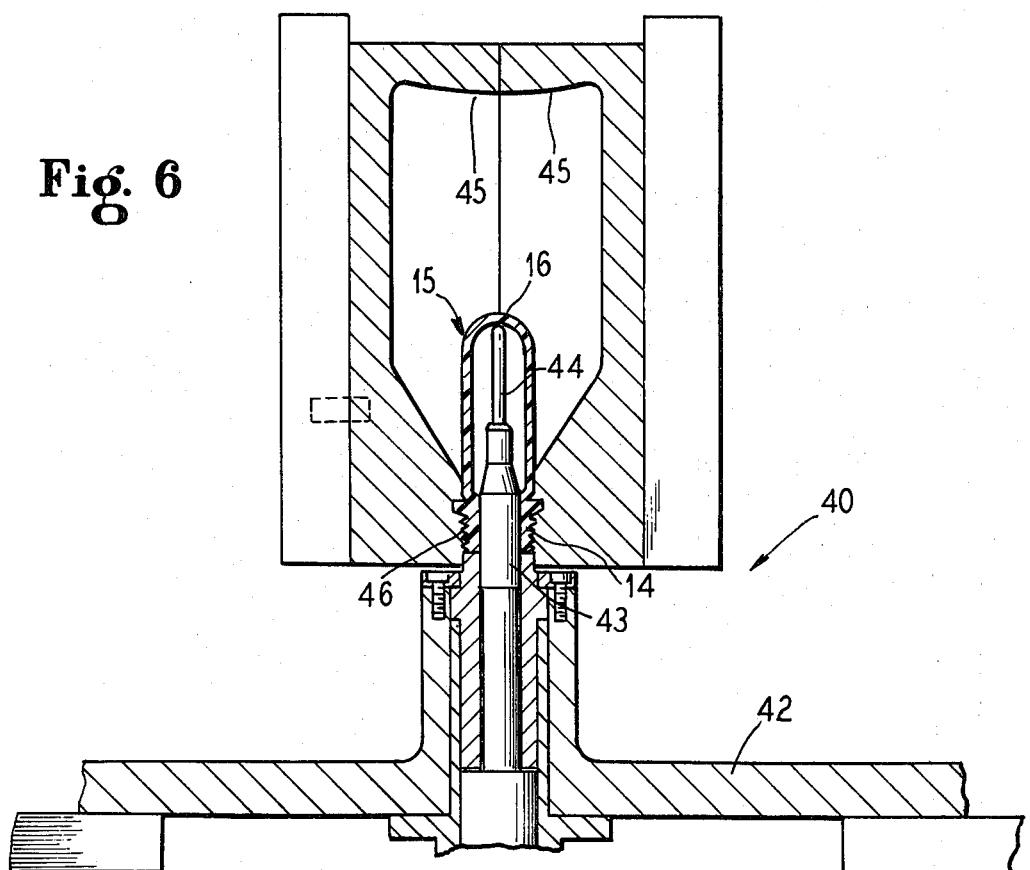
FIG. 6 is a view of the apparatus of FIG. 5 showing the mold closed on the parison.
Figure 7:
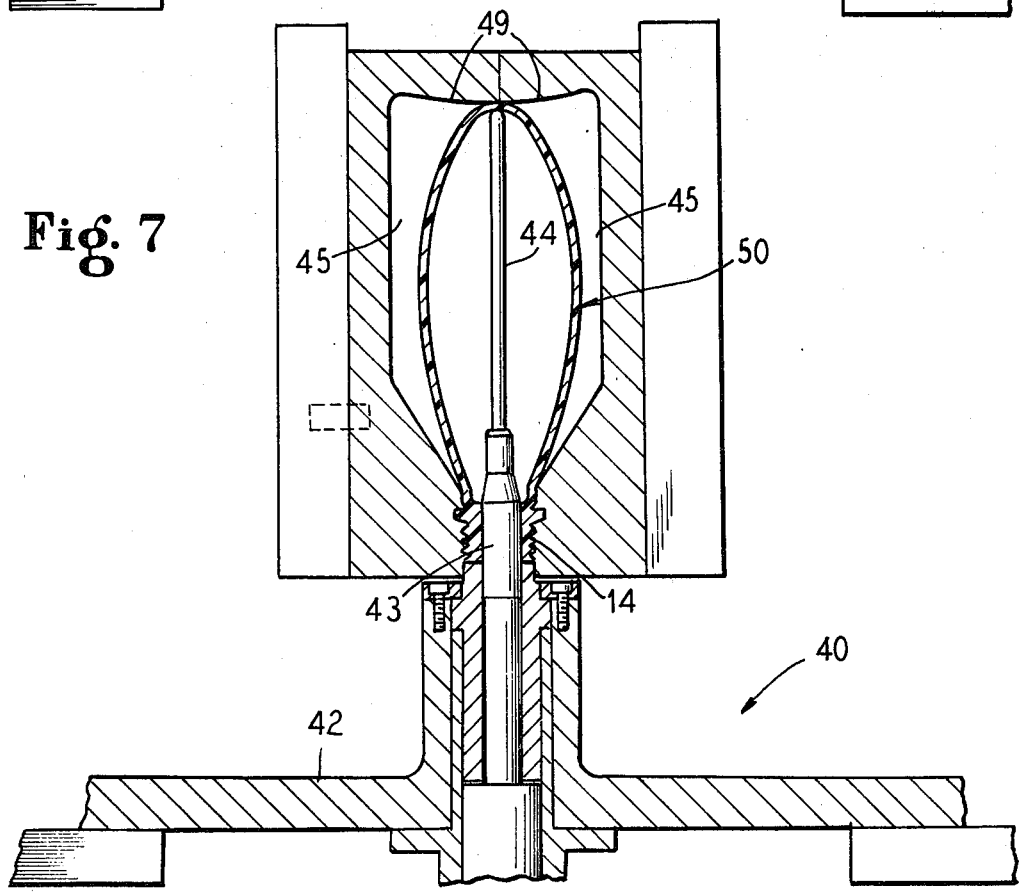
FIG. 7 is a view similar to FIGS. 5 and 6 showing the stretch rod fully extended and the bottle partially blown.

From the open position of FIG. 5 the apparatus 40 is closed to the position of FIG. 6 with the mold halves 45 coming together and with the swage 43 extended into the open end of the parison so that the neck and thread forming portions 46 of the die can mold the thick neck 14 of the bottle on the parison. The projection of the swage 43 into the position of FIG. 6 also moves the stretch rod 44 against the closed end 16 of the parison.

From the position of FIG. 6 the apparatus 40 is further activated to eject the stretch rod 44 beyond the swage 43 into closely spaced relation from the bottom forming portion 49 of the dies 45 thereby effecting a stretching of the parison 15 to the full height of the dies. At the same time a blowing agent is introduced into the parison forming an axially elongated and a hoop stretched balloon end 50 in the closed die.

Figure 8:
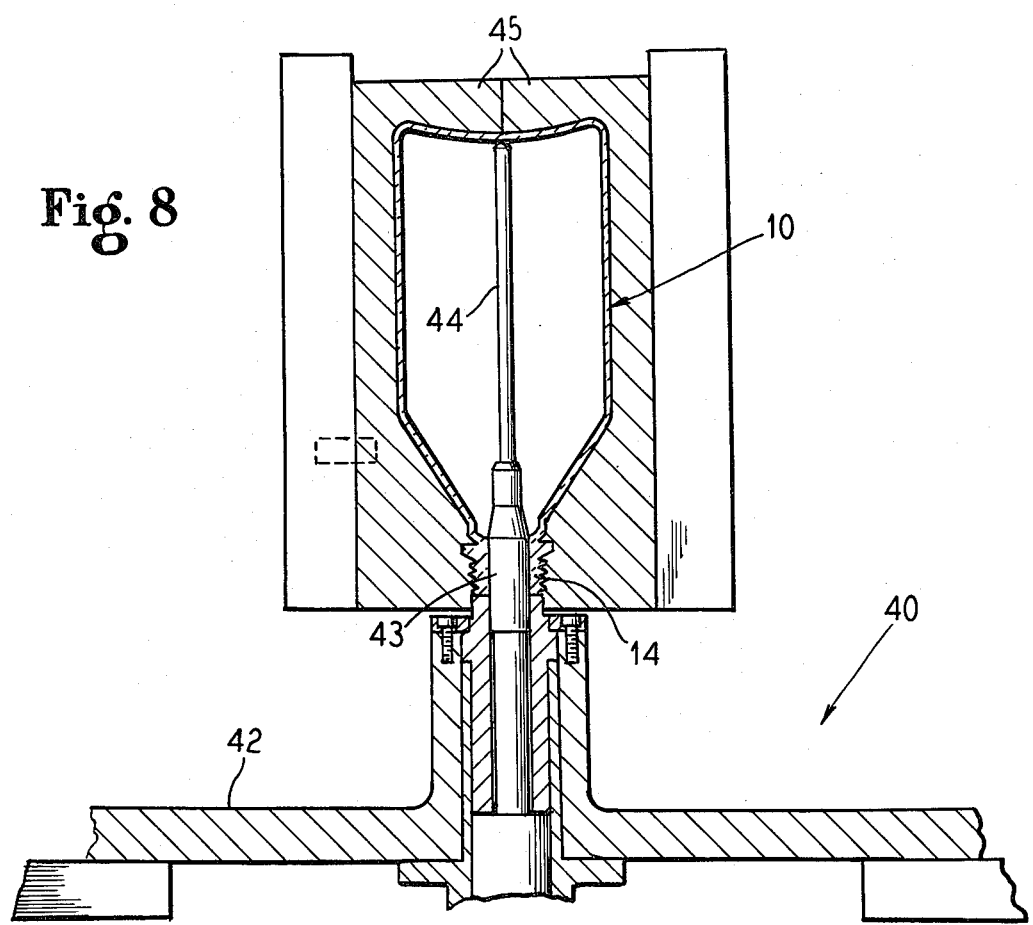
FIG. 8 is a view similar to FIGS. 5 to 7 showing the bottle fully blown.

The balloon 50 is then blown into the finished bottle shape 10 as shown in FIG. 8 with the plastics material biaxially stretched to produce the strong product.

Figure 9:
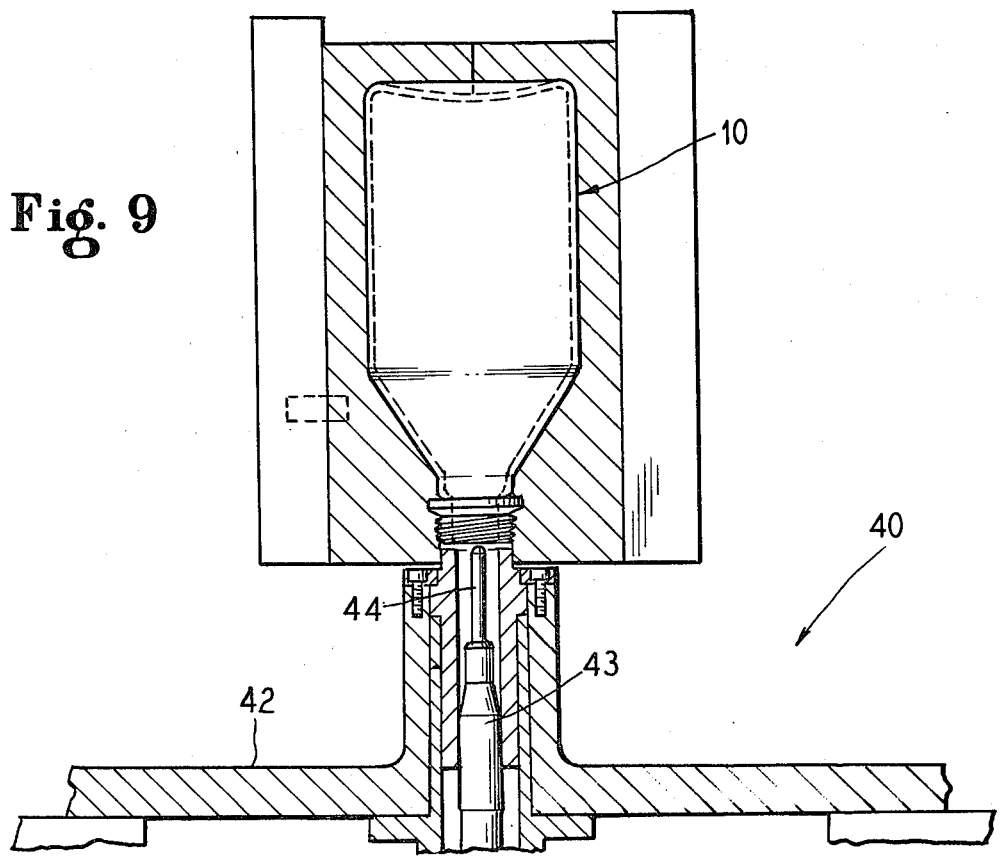
FIG. 9 is a view similar to FIGS. 5 to 8 but showing the stretch rod and swage of the apparatus in a down position with the bottle decompressing in the mold.

Finally, as shown in FIG. 9, the stretch rod 44 and the swage 43 are retracted from the bottle 10, the gas pressure in the bottle is released, and the dies 45 are separated back to the position of FIG. 5 and the bottle is removed.

The preferred stretch mold cycle has a radial stretch ratio of about 2.4:1; an axial stretch ratio of about 2.2:1; a blow pressure of 250 PSI; a mold temperature of 55° F. and a hold time in the mold of about 4.75 seconds.

The following examples illustrate preferred specific details of the above described blow molding processes for producing clear, transparent, glossy bottles from polypropylene parisons produced from low temperature melts as described above.

EXAMPLE I

A Biaxomat blow mold machine known commercially as Model "Mark VI-2" was set up to produce 32 oz bottles. Parisons of "REXENE" polypropylene copolymer having a diameter of about 1.5 inches, a height of about 4.3 inches and a thickness of about 0.16 inches were used. These parisons, were cylindrical with a rounded closed end as shown in the drawings. The machine cycle was set at 7.0–7.03 seconds with the main zone at 295° F. and the tempering zone at 296° F. The speed potential was set at 585 with a bottle decompression at 0.4 seconds, a zero stretch blow, a 0.5 second side eject, a recirculation of 9.99 seconds with no cooling, a main blow off of 2.2 seconds, and a parison release of 0.2 seconds. The main blow off was 260 psi, the stretch blow was shut off; the side eject was 80 psi and the stretch rod was 280 psi. The mold was closed, for 4.75 seconds and the bottle mold was kept at about 40° F.

EXAMPLE II

The same blow mold machine of Example I was set up to produce the same type bottles from the same size and shape parisons but with the parisons formed of Phillips Petroleum polypropylene homopolymer. The same machine cycle of 7.0 to 7.03 seconds was used but the main zone was heated to 324° F. with the tempering zone at 326° F., the speed potential was also set at 585 but the decompression time was 0.9 seconds and a stretch blow of 0.5 seconds was used. The recirculation time was 9.99 seconds, the main blow off 1.6 seconds, the parison release 0.2 seconds, the main blow 250 psi with the stretch blow shut off. The side eject and stretch rod pressures were the same as in Example I. The bottle mold was chilled with city water to about 40° F.

The following Table compares haze, clarity and gloss properties of polypropylene bottles prepared according to this invention with the clearest injection blow molded bottle commercially available prior to the invention:

TABLE I

| Resin Formulation | Biaxially Oriented Bottles of This Invention | | | | Commercially Available Blow Molded Bottles |
|---|---|---|---|---|---|
| | Shell 6313 | Eastman 296E | Shell 6313 | Eastman 296E | Shell 6313 |
| Bottle Size | 32 oz. | 32 oz. | 16 oz. | 16 oz. | 16 oz. |
| Haze | 2.4 | 5.7 | 4.5 | 5.5 | 57.0 |
| Clarity | 20.5 | 6.4 | 4.0 | 6.9 | 0.3 |
| Gloss 45° | over 100 | 91 | over 100 | 88 | 51 |
| Gloss 60° | over 100 | 96 | over 100 | over 100 | 59 |

The tested commercially available prior art blow molded polypropylene bottle in the above Table was the clearest commercially available bottle.

The tests were conducted using the standard Gardner Haze Meter according to ASTM Standards D 1003, with a Gardner Clarity Meter according to ASTM Standards D 1746 and with Gardner Gloss Meters according to ASTM Standards D 2457 in the cylindrical portion of the body. The clarity measurements showed considerable scatter and the values indicated are averages of varying numbers.

The following Table summarizes specific examples of producing polypropylene parisons according to this invention which yield clear glossy bottles by the above-described blow mold techniques:

| Polypropylene Polymer | Melt Temp. (°F.) | Inj. Time (sec.) | Mold Core (°F.) | Cavity (°F.) | Inj. Hyd. (psi) | Pres. Back (psi) | Hold Pressure (psi) | Inj. Screw C/R |
|---|---|---|---|---|---|---|---|---|
| Homopolymer | 535/605 | 2/15 | 76–82 | 76–82 | Intrusion | 300 | 0/800 | 2.5 |
| Homopolymer | 502/585 | 2.8 | 78 | 78 | Intrusion | 300 | 250 | 2.5 |
| Copolymer | 510 | 3.8 | 33 | 34 | 700 | 150 | 700 | 3.25 |
| Copolymer | 490 | 4.0 | 34 | 33 | 700 | 150 | 700 | 3.25 |
| Copolymer | 508 | 4.8 | 45 | 44 | 800 | 150 | 800 | 3.25 |
| Homopolymer | 505 | 7.0 | 36 | 36 | 150 | 150 | 800 | 3.25 |

From the above descriptions it will be understood therefore that this invention now provides polypropylene parisons and exceptionally clear, transparent, glossy and strong polypropylene containers by stretch blow molding the parisons under conditions that biaxially orient polypropylene polymers.

We claim as our invention:

1. A method for making a blow-molded clear polypropylene bottle; comprising working and heating crystalline polypropylene so as to form a melt, causing a sample of said melt to fall and while falling determining the appearance of the sample, controlling said working and heating so as to provide said melt with a temperature not substantially higher than causes said sample to change from a cloudy appearance to a clear appearance, flowing said melt while at said temperature onto a polished cold surface having a temperature no higher than room temperature so as to form a parison, said melt being flowed at a rate slower than one causing said melt to fracture during said flowing, allowing said parison to cool so as to solidify and removing it from said cold surface, heating said parison to a stretch blow molding temperature just below its amorphous flow temperature and no higher than the minimum permitting stretch blow molding of the parison, placing the parison in a stretch blow molding die having a temperature no higher than room temperature and having a cavity shaped to form said bottle, the cavity having a bottom for forming the bottle's bottom, and stretch blow molding the parison by stretching it first completely to the cavity's said bottom while at the same time blowing the parison only so as to cause it to only partially fit said cavity, and only thereafter completely blowing the parison so as to cause it to completely fit said cavity and form said bottle, and removing the bottle from said cavity.

* * * * *